(12) United States Patent
Kapaan et al.

(10) Patent No.: US 6,684,988 B2
(45) Date of Patent: Feb. 3, 2004

(54) DRUM BRAKE AND ELECTRIC ACTUATOR THEREFOR

(75) Inventors: Hendrikus Jan Kapaan, Nieuwegein (NL); Jacobus Zwarts, Nieuwegein (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 10/148,164

(22) PCT Filed: Dec. 7, 2000

(86) PCT No.: PCT/NL00/00810
§ 371 (c)(1), (2), (4) Date: Jun. 19, 2002

(87) PCT Pub. No.: WO01/42677
PCT Pub. Date: Jun. 14, 2001

(65) Prior Publication Data
US 2003/0038002 A1 Feb. 27, 2003

(30) Foreign Application Priority Data
Dec. 7, 1999 (NL) .............................................. 1013783

(51) Int. Cl.[7] .................................................. B60L 7/00
(52) U.S. Cl. ........................ 188/162; 188/71.9; 188/728
(58) Field of Search ................ 188/71.7, 71.9, 188/72.7, 72.8, 79.51, 155, 156, 158, 159, 162

(56) References Cited

U.S. PATENT DOCUMENTS

| | | | | |
|---|---|---|---|---|
| 1,928,750 A | | 10/1933 | Apple et al. | |
| 2,885,032 A | * | 5/1959 | Dombeck | 188/79.51 |
| 3,633,714 A | * | 1/1972 | Klaue | 188/134 |
| 3,809,191 A | * | 5/1974 | Woodward | 188/106 A |
| 4,850,459 A | * | 7/1989 | Johannesen et al. | 188/156 |
| 5,147,118 A | * | 9/1992 | Reuter et al. | 303/115.2 |
| 5,310,026 A | * | 5/1994 | Shaw et al. | 188/156 |
| 5,855,255 A | * | 1/1999 | Bock et al. | 188/162 |
| 5,913,390 A | * | 6/1999 | Hostetler | 188/79.51 |
| 6,306,230 B1 | * | 10/2001 | Hengerer | 148/653 |
| 6,364,085 B1 | * | 4/2002 | Ueno et al. | 192/219.4 |
| 6,367,597 B1 | * | 4/2002 | De Vries et al. | 188/196 V |

FOREIGN PATENT DOCUMENTS

| | | |
|---|---|---|
| DE | 541 523 C | 1/1932 |
| EP | 0 385 620 A1 | 9/1990 |
| GB | 1148523 | 4/1969 |

* cited by examiner

Primary Examiner—Christopher P. Schwartz
Assistant Examiner—Devon Kramer
(74) Attorney, Agent, or Firm—Oliff & Berridge, PLC

(57) ABSTRACT

An actuator for a drum brake comprises a housing (1), a screw mechanism having at least one screw (3,6) and a nut (4, 7), which screw mechanism (2) is supported with respect to the housing (1), and drive means (3) which are drivingly connected to the screw mechanism for providing a linear movement of at least one of the screw and nut with respect to the housing upon driving the screw mechanism. The screw mechanism comprises two axially aligned screws which have opposite lead angles and two corresponding nuts, said screws each engaging a respective nut, the drive means being connected to both screws or to both nuts.

20 Claims, 2 Drawing Sheets

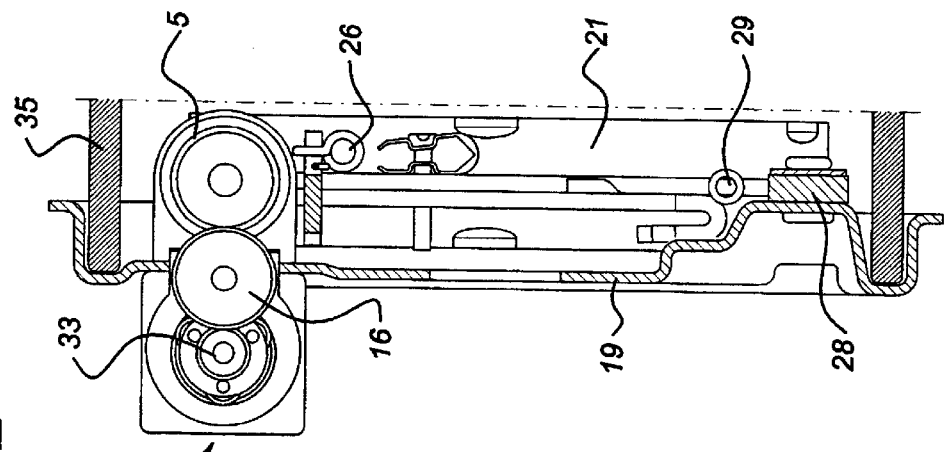
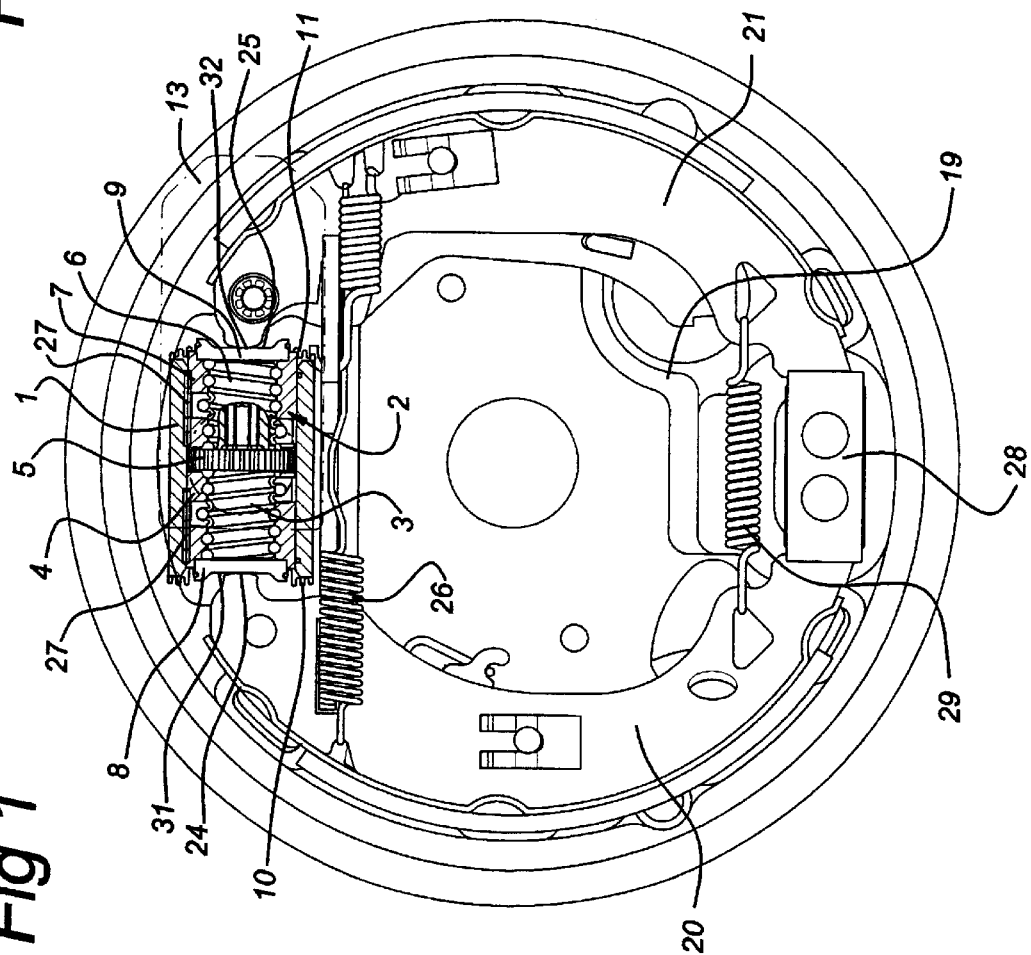

DRUM BRAKE AND ELECTRIC ACTUATOR THEREFOR

BACKGROUND OF THE INVENTION

1. Field of the Invention

The invention is related to an actuator for a drum brake, comprising a housing, a screw mechanism comprising at least one screw and a nut, which screw mechanism is supported with respect to the housing, and drive means which are drivingly connected to the screw mechanism for providing a linear movement of at least one of the screw and nut with respect to the housing upon driving the screw the mechanism.

2. Description of Related Art

Such actuator is known from U.S. Pat. No. 5,310,026 to Shaw et al. It comprises a screw which is connected to the actuator housing by means of a thrust bearing. The associated nut is held slidably within the housing, and is driven linearly by rotating the screw. Upon actuation, a linear force is exerted through the nut and the housing. This housing should therefore be movable, so as to provide e.g., a balanced braking action in a drum brake.

SUMMARY OF THE INVENTION

Such actuator is known from U.S. Pat. No. 5,310,026. It comprises a screw which is connected to the actuator housing by means of a thrust bearing. The associated nut is held slidably within the housing, and is driven linearly by rotating the screw. Upon actuation, a linear force is exerted through the nut and the housing. This housing should therefore be movable, so as to provide e.g. a balanced braking action in a drum brake.

The object of the invention is to provide an improved actuator, in which the housing is not part of the force trajectory. This object is achieved in that the screw mechanism comprises two axially aligned screws which have opposite lead angles and two corresponding nuts, said screws each engaging a respective nut, the drive means being connected to both screws or to both nuts.

The actuator according to the invention provides a driving action through the pair of nuts or screws, without exerting loads on the housing. As a result, the housing can be carried out as a relatively simple component, e.g., a cylindrical tube, the nuts having a corresponding cylindrical circumference and fitting slidably within the cylindrical tube.

At their ends, the nuts may have an actuating member which can take several forms, dependant on the envisaged application of the actuator.

At or near the ends of the nuts facing away from each other a seal, e.g., a sealing bellows is provided, which seals are connected to the respective ends of the cylindrical tube. The internally located screw thread of nuts and screws is thereby well protected against dirt, etcetera. This is particularly of importance in the case of ball or roller screws.

The drive means are drivable through an opening in the housing, and can be carried out as a spline—, e.g., a screw gear wheel. Furthermore, the drive means may comprise a motor, the stator of which engages the housing, and the rotor of which is drivingly connected to the spline.

According to a preferred embodiment, the motor is drivably connected to a drive gear wheel which meshes with the spline, said drive gear wheel being of greater width than the spline so as to allow axial displacements of the screws and spline while maintaining the mesh.

As a result, the nuts which are driven towards or away from each other can adapt themselves freely to the surrounding structure through the actuating heads thereof.

The maximum diameter of the spline is smaller than the diameter of the bore of the cylindrical tube, the nuts at their side facing the spline being recessed so as to allow displacement of said nuts along said drive gear wheel.

The housing and the nuts can be held non-rotatably with respect to each other through a groove-pin connection.

The invention is furthermore related to an arrangement for for a drum brake, comprising a backing plate to be connected to a vehicle wheel suspension, e.g., a steering knuckle, housing etc., a pair of brake shoes supported on said backing plate, a screw actuator engaging said brake shoes and a motor for driving said screw actuator so as to obtain a linear movement thereof for displacing the brake shoes outwardly and away from each other vice versa, said actuator comprising a housing and a screw mechanism which is supported with respect to the housing, and with at least one screw and a nut.

Such arrangement is known from U.S. Pat. No. 5,310,026 as well.

According to the invention, the screw mechanism comprises two axially aligned screws which have opposite lead angles and two corresponding nuts, said screws each engaging a respective nut the drive means being connected to both screws or to both nuts.

The actuating members may, according to a first possibility, be connected pivotably to a respective brake shoe. Alternatively, each actuating member may have an abutment surface, the brake shoes being held under pretension against a respective abutment surface by means of a spring.

In the latter case, each nut is held non-rotatably in the cylindrical tube. In case of a pivotable connection between actuating members and brake shoes, no further precautions are necessary for preventing mutual rotations of the nuts with respect to the housing.

The housing can be fixedly connected to the backing plate.

The drive means may comprise a magnet coupling for holding the braking torque under currentless condition (hand brake).

BRIEF DESCRIPTION OF THE DRAWINGS

The invention will now be described further with reference to a drum brake with an actuator according to the invention shown in the drawings.

FIG. 1 shows a view on the arrangement according to the invention including the actuator.

FIG. 2 shows a cross section to the arrangement according to FIG. 1, including part of a brake drum.

DETAILED DESCRIPTION OF EXEMPLARY EMBODIMENTS

Figure 3:
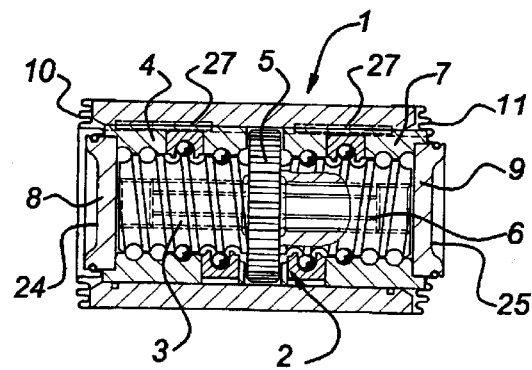
FIG. 3 shows a first embodiment of the actuator according to the invention.

The arrangement shown in FIGS. 1 and 2 comprises a backing plate 19, which can be connected to a vehicle wheel suspension (not shown). Onto the backing plate 19, a pair of brake shoes 20, 21 is mounted. The brake shoes 20, 21 are each supported on an anchor 28 of the backing plate 19. Through springs 26, 29, the brake shoes 20, 21 are constantly urged towards the anchor 28, as well as to a screw mechanism 2.

The screw mechanism 2, which is contained in a housing 1 fixedly connected to the backing plate 19 as well, comprises two axially aligned screws 3, 6 which have opposite lead angles, as well as two corresponding nuts 4, 7. The nuts 4, 7 are slidably, but non-rotatably through spline/groove connection 27, within the housing 1. The screws 3, 6 and nuts 4, 7 engage each other through balls or ball screws (not shown).

The nuts 4, 7 each carry an actuating head 8, 9, against the surfaces 24, 25 of which the noses 31, 32 of the brake shoes 20, 21 are urged through spring 26.

Between the screws 3, 6, a spline wheel 5 is connected. As shown in the enlarged detail of FIG. 6, this spline wheel 5 protrudes through an opening 12 in the housing 1. In this opening 12, a drive gear wheel 16 is accommodated, the width of which is greater than the width of the spline wheel 5. In turn, the gear wheel 16 engages the pinion wheel 33 which is connected to the rotor 15 of the motor 13. This motor 13 is connected to the backing plate 19 as well, however to the side opposite the side where the actuator, e.g., housing 1, or screw mechanism 2, is mounted. The drive gear wheel 16 thus protrudes through the opening 34 in the backing plate 19, as well as through the opening 12 in the housing 1. Upon energising the stator 14 of the motor 13, the rotor 15, and thereby the pinion gear 33, the drive gear wheel 16 and the spline wheel 5 are set in rotation. Thus, the actuator particularly the screw mechanism 2, provides the desired mutual displacement of the braking shoes 20, 21 towards or away from the brake drum 35 (shown in FIG. 2).

In the embodiment of FIGS. 1, 3, the nuts 4, 7 each carry an actuating head or member 8, 9 having a flat outer surface 24, 25. As mentioned, in that case it is necessary to prevent rotation of the nuts 4, 7 with respect to the housing 1 by means of the spline/groove connections 27.

Figure 4:
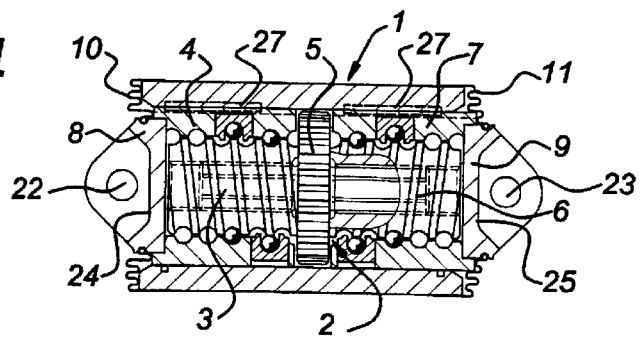
FIGS. 4 and 5 show a second embodiment of the actuator.
Figure 5:
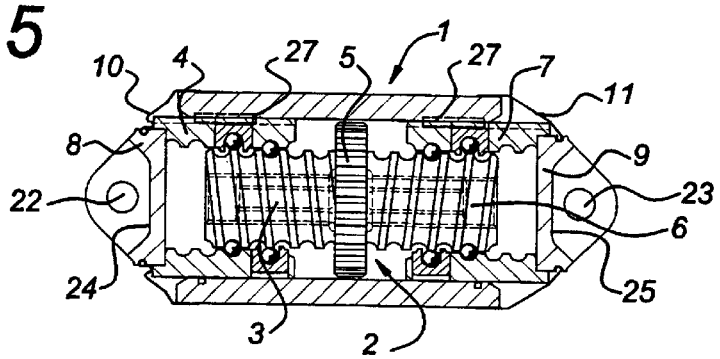
Figure 6:
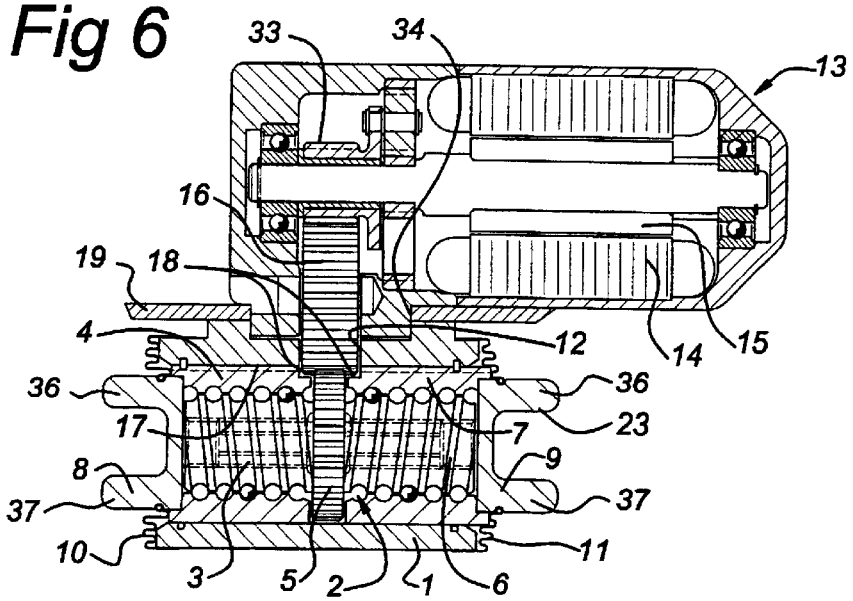
FIG. 6 shows the actuator according to FIGS. 4 and 5 in combination with the drive motor.

In the embodiment of FIGS. 4, 5, and also of FIG. 6, the actuating members are carried out with flanges 36, 37 having eyes 22, 23. The corresponding ends 31, 32 of the brake shoes 20, 21 in that case carry eyes as well, in such a way that the pivotable connection is obtained by inserting pins through the respective eyes 22, 23, as well as the eyes in the ends 31, 32 (not shown) of the brake shoes 20, 21.

In this embodiment, the nuts 4, 7 are held against rotation through this pivotable connection, so that no additional spline/groove connection is necessary here.

By means of bellows 10, 11, the interior of the housing 1 is protected against dirt etcetera.

What is claimed is:

1. An actuator for a drum brake, comprising:
    a housing (1),
    a screw mechanism (2) comprising at least one screw (3) and a first nut (4), wherein the screw mechanism is supported with respect to the housing (1), and
    drive means (5) that are drivingly connected to the screw mechanism (2) for providing a linear movement of the at least one screw (3) and the first nut (4) with respect to the housing (1) upon driving the screw mechanism (2), wherein
        the screw mechanism (2) further comprises two axially aligned screws (3, 6) which have opposite lead angles, and two corresponding nuts (4, 7),
        each of the two axially aligned screws (3, 6) engages a respective nut of the two corresponding nuts (4, 7) with the at least one screw (3) engaging the first nut (4),
        the drive means (5) are connected to both of the two axially aligned screws (3, 6) or to both of the two corresponding nuts (4, 7),
        the housing comprises a cylindrical tube (1), the two corresponding nuts (4, 7) having a corresponding cylindrical circumference and fitting slidably within the cylindrical tube (1), and
        the drive means comprise a disc (5) which is drivable through an opening (12) in the cylindrical tube (1).

2. The actuator according to claim 1, wherein each of the two corresponding nuts (4, 7) have an actuating member (8, 9) at opposite ends of the two corresponding nuts (4,7) facing away from each other.

3. The actuator according to claim 1, wherein at or near the ends of the two corresponding nuts (4, 7) facing away from each other a seal, is provided, and the seals are connected to respective ends of the cylindrical tube (1).

4. The actuator according to claim 1, wherein the drive means comprise a spline (5).

5. The actuator according to claim 4, wherein the drive means comprise a motor (13), the stator (14) that engages the housing (1), and the rotor (15) that is drivingly connected to the spline (5).

6. The actuator according to claim 5, wherein the rotor (15) is drivably connected to a drive gear wheel (16) which meshes with the spline (5), the drive gear wheel (16) being of greater width than the spline (5) to allow axial displacements of the two axially aligned screws (3, 6) and the spline (5) wheel while maintaining the mesh.

7. The actuator according to claim 6, wherein a maximum diameter of the spline (5) is smaller than a diameter of a bore (17) of the cylindrical tube (1), and the two corresponding nuts (4, 7) at their side facing the spline (5) being recessed (18) to allow displacement of the two corresponding nuts (4, 7) along the drive gear wheel (5).

8. The actuator according to claim 1, wherein the housing (1) and the first nut (4) are held non-rotatably with respect to each other through a groove-pin connection (27).

9. An arrangement for a drum brake, comprising:
    a backing plate (19) to be connected to a vehicle wheel suspension,
    a pair of brake shoes (20, 21) supported on the backing plate (19),
    a screw actuator engaging the brake shoes, and
    a motor (13) for driving the screw actuator (1, 2) to obtain a linear movement thereof for displacing the brake shoes (20, 21) outwardly and away from each other,
    the screw actuator further comprising a housing (1) and a screw mechanism (2) which is supported with respect to the housing (1), and two axially aligned screws (3, 6) which have opposite lead angles and two corresponding nuts (4, 7), wherein
        each of the two axially aligned screws (3, 6) engages a respective nut of the two corresponding (4, 7),
        the drive means (5) are connected to both of the axially aligned screws (3, 6) or to both of the two corresponding nuts (4, 7),
        the housing comprises a cylindrical tube (1), the two corresponding nuts (4, 7) having a corresponding cylindrical circumference and fitting slidably within the cylindrical tube (1), and
        each of the two corresponding nuts (4, 7) have an actuating member (8, 9) at opposite ends of the two corresponding nuts (4, 7) facing away from each other.

10. The arrangement according to claim 9, wherein each actuating member (8, 9) is connected pivotably (22, 23) to a respective brake shoe of the brake shoes (20, 21).

11. The arrangement according to claim 9, wherein each actuating member (8, 9) has first abutment surface (24, 25), the brake shoes (20, 21) being held under pretension against a second abutment surface (24, 25) by mews of a spring (26).

12. The arrangement according to claim 11, wherein each nut (4, 7) is held non-rotatably in the cylindrical tube (1).

13. The arrangement according to claim 12, wherein at or near the ends of the nuts (4, 7) facing away from each other a seal, (10, 11) is provided, wherein the seals are connected to respective ends of the cylindrical tube (1).

14. The arrangement according to claim 13, wherein the drive means comprise a spline (5) which is drivable through an opening (12) in the cylindrical tube (1).

15. The arrangement according to claim 14, wherein the drive means comprise a screw gear wheel (5).

16. The arrangement according to claim 15, wherein the drive means comprise a motor (13), the stator (14) that engages the housing (1), and the rotor (15) being drivingly connected to the screw gear wheel (5).

17. The arrangement according to claim 16, wherein the rotor (15) is drivable connected to a drive gear wheel (16) which meshes with the screw gear wheel (5), the drive gear wheel (16) being of greater width than the screw gear wheel (5) to allow axial displacements of the two axially aligned screws (3, 6) and the screw gear wheel (5) wheel while maintaining the mesh between the screw and drive pear wheels (5, 16).

18. The arrangement according to claim 17, wherein a maximum diameter of the screw gear wheel (5) is smaller than a diameter of a bore (17) of the cylindrical tube (1), and the two corresponding nuts (4, 7) at their side facing the drive gear wheel (5) being recessed (18) to allow displacement of the two corresponding nuts (4, 7) along the drive gear wheel (5).

19. The arrangement according to claim 9, wherein the housing (1) is connected to the backing plate (19).

20. The arrangement according to claim 9, wherein the drive comprise a magnet coupling for holding the braking torque under a condition without electric current.

* * * * *